(12) United States Patent
Weltman et al.

(10) Patent No.: US 7,870,140 B2
(45) Date of Patent: Jan. 11, 2011

(54) SYSTEM AND METHOD OF INCORPORATING USER PREFERENCES IN IMAGE SEARCHES

(75) Inventors: Matthew Weltman, Toms River, NJ (US); Christine Podilchuk, Warren, NJ (US)

(73) Assignee: D&S Consultants, Inc., Eatontown, NJ (US)

( * ) Notice: Subject to any disclaimer, the term of this patent is extended or adjusted under 35 U.S.C. 154(b) by 360 days.

(21) Appl. No.: 11/670,775

(22) Filed: Feb. 2, 2007

(65) Prior Publication Data

US 2007/0288432 A1 Dec. 13, 2007

Related U.S. Application Data

(60) Provisional application No. 60/812,646, filed on Jun. 12, 2006, provisional application No. 60/816,686, filed on Nov. 29, 2006, provisional application No. 60/861,685, filed on Nov. 29, 2006, provisional application No. 60/861,932, filed on Nov. 30, 2006, provisional application No. 60/873,179, filed on Dec. 6, 2006.

(51) Int. Cl.
G06F 7/00 (2006.01)
(52) U.S. Cl. .............................. 707/749; 707/999.107; 707/915
(58) Field of Classification Search ............... 707/1–10, 707/102, 749, 15, 999.107, 999.001–999.019
See application file for complete search history.

(56) References Cited

U.S. PATENT DOCUMENTS

| | | | |
|---|---|---|---|
| 4,503,557 A | 3/1985 | Maeda | |
| 4,901,362 A | 2/1990 | Terzian | |
| 5,459,739 A | 10/1995 | Handley | |
| 5,751,286 A | 5/1998 | Barber | |
| 5,757,959 A | 5/1998 | Lopresti | |
| 5,761,538 A | 6/1998 | Hull | |
| 5,832,474 A | 11/1998 | Lopresti et al. | |

(Continued)

FOREIGN PATENT DOCUMENTS

EP         0949580         2/2001

OTHER PUBLICATIONS

Podilchuk, "A New Face Recognition Algorithm Using Bijective Mappings" 2005 IEEE Comp Soc Conf on Comp Vision and Pattern Recogn, Jun. 20-26, 2005, vol. 3, pp. 165 US.

(Continued)

*Primary Examiner*—Mohammad Ali
*Assistant Examiner*—John P Hocker
(74) *Attorney, Agent, or Firm*—Fox Rothschild; Dennis M. Carleton

(57) ABSTRACT

A system and method for incorporating relevance feedback into an image search. A multimedia database is first searched using a domain specific similarity matrix (DSM), resulting in a list of image results ranked by their similarity to a query key-image. The results are then reexamined using a personalized similarity matrix (PSM). The PSM includes image that have been selected by the user, either in previous searches or from lists of candidate images. Similarity scores are calculated between the domain relevant images in the PSM and the results images. The new similarity scores are combined with the original similarity scores and the images is re-ranked into a final results list. Any images selected by the user may then be used to update and/or expand the PSM.

7 Claims, 2 Drawing Sheets

U.S. PATENT DOCUMENTS

| | | |
|---|---|---|
| 5,875,446 A | 2/1999 | Brown |
| 5,940,778 A | 8/1999 | Marfurt |
| 6,104,835 A | 8/2000 | Han |
| 6,161,130 A | 12/2000 | Horvitz |
| 6,295,371 B1 | 9/2001 | Rucklidge |
| 6,581,034 B1 | 6/2003 | Choi |
| 6,616,704 B1 | 9/2003 | Birman |
| 6,633,857 B1 | 10/2003 | Tipping |
| 6,741,725 B2 | 5/2004 | Astle |
| 6,898,469 B2 | 5/2005 | Bickford |
| 6,915,009 B2 | 7/2005 | Foote |
| 6,944,602 B2 | 9/2005 | Cristianin |
| 6,990,217 B1 | 1/2006 | Moghaddam |
| 7,054,847 B2 | 5/2006 | Hartman |
| 2002/0078043 A1* | 6/2002 | Pass et al. .............. 707/6 |
| 2002/0097914 A1* | 7/2002 | Yaung .................. 382/225 |
| 2004/0243567 A1* | 12/2004 | Levy .................... 707/3 |
| 2005/0129290 A1 | 6/2005 | Lo |
| 2005/0147302 A1 | 7/2005 | Leung |
| 2006/0093190 A1* | 5/2006 | Cheng et al. .......... 382/115 |
| 2006/0107823 A1 | 5/2006 | Platt |
| 2006/0112068 A1 | 5/2006 | Zhang |
| 2006/0251339 A1 | 11/2006 | Gokturk |

OTHER PUBLICATIONS

Hsuan Shih, Lee, "A Fast Algorithm for Computing the Transitive Closure [etc]," IEEE Proc of the Int ICSC Cong on Comp Intel Meth and Appl, pub. 1999 (Jun. 22-25, 1999) US.

Bhatnagar et al "Syntactic Pattern Recognition of HRR Signatures," SPIE Proc. v 4053, 190, pp. 452-466, Soc of Photo-Opt Instrum Engineers, Bellingham WA (2000).

Oommenn et al "On Using Parametric String Databases and Vector Quantization [etc]," IEEE Proc. Int. Conf. on Sys, Man and Cyber, v 1, p. 511-517 IEEE, Piscataway NJ (1997).

Chen, "Fast Schemes for Computing Similarities Between Gaussian HMMs [ect]" EURASIP Jour on Appl Sign Pro (EURASIP J. Appl. Sig Pro v 2005, n13, Aug. 1, 2005 p. 1984-1993 US.

Asano, "Efficient Algorithms for Optimization-Based Image Segmentation" (NDN-174-0695-5802-4) IEEE Int Jour of Comp Geo & App, v11, No. 2, 2001 p. 145-166 US.

Menico, "Faster String Searches (Boyer-Moore Algorithm)" Dr. Dobb's Jour of Software Tools, v14 n7 pub Jul. 1989 p. 74-78 (US).

* cited by examiner ns filed on
SYSTEM AND METHOD OF INCORPORATING USER PREFERENCES IN IMAGE SEARCHES

CROSS REFERENCE TO RELATED APPLICATIONS

This application is related to, and claims priority from, U.S. Provisional Patent application No. 60/861,686 filed on Nov. 29, 2006 by C. Podilchuk entitled "Method for multimedia information retrieval using a combination of text and exemplar images in the query," the contents of which are hereby incorporated by reference.

FIELD OF THE INVENTION

The present invention relates to systems and methods of incorporating user preferences in images searches, and more particularly to systems and methods of incorporating user preferences in image searches using a personalized similarity matrix.

BACKGROUND OF THE INVENTION

A system and method of searching images that uses a matrix of similarity scores has been described in, for instance, co-pending U.S. patent application Ser. No. 11/619,133 entitled "System and Method for Searching Multimedia using Exemplar Images" filed by C. Podilchuk on Jan. 2, 2007, the contents of which are hereby incorporated by reference. Such a system typically returns a ranked list of images or video clips that match an image based search. The system may, for instance, return a list of images in order of similarity to a query or key-image.

The matrix used in such a search system typically contains similarity scores taken between every pair of a selected group of objects contained within an image or video library that may reside on, for instance, a database, digital video recorder or a computer network. One method used to measure the similarity between two images is the Pictorial or P-edit distance that is described in, for instance, co-pending U.S. patent application Ser. No. 11/619,092 entitled "System and Method for Comparing Images using an Edit Distance" filed by C. Polilchuk on Jan. 2, 2007, the contents of which are hereby incorporated by reference. The P-edit distance has the advantage of being robust to variations in camera viewpoint and the pose of the objects in the images. The similarity matrix can be searched quickly using methods such as those disclosed in co-pending U.S. patent application Ser. No. 11/619,104 entitled "System and Method for Rapidly Searching a Database" filed by C. Podilchuk on Jan. 2, 2007, the contents of which are hereby incorporated by reference. These methods facilitate a fast image search of the image data that can use image data as at least part of the query. A separate similarity matrix may be formed for different domains such as sports, shopping, cars etc. These domain specific similarity matrices (DSM) may be exchanged among users and may be used to mix and match domains.

A shortcoming of an image search system that uses such generic domain similarity matrices is that the results do not incorporate a user's preferences or previous choices. A image search system capable of monitoring or incorporating a user's previous choices and preferences and using them to enhance the ranking of the returned images would be highly desirable as it would enable a user to more rapidly find the images or video that are of particular interest to the user.

SUMMARY OF THE INVENTION

Briefly described, the invention provides a system and method for incorporating relevance feedback, in the form of user input or preferences, into an image search in order to improve the results of that image search.

In a preferred embodiment, a multimedia database is first searched using a domain specific similarity matrix (DSM), resulting in a list of image results ranked by their similarity to a query key-image. The list of image results returned by the DSM is then reexamined using a personalized similarity matrix (PSM). The personalized similarity matrix includes image that have either been selected by the user in previous searches or entered by the user for lists of candidate images. Images relevant to the domain being searched may be selected from the PSM. Similarity scores are then calculated between these domain relevant images and the results images. These new similarity scores are then combined with the original similarity scores and the list of images is re-ranked into a final results list. The user is then presented with this re-ranked final results list.

The image search engine then monitors which of the results the user selects. The selected images may then be used to update and/or expand the PSM.

These and other features of the invention will be more fully understood by references to the following drawings.

This Summary is neither intended nor should it be construed as being representative of the full extent and scope of the present invention, which these and additional aspects will become more readily apparent from the detailed description, particularly when taken together with the appended drawings.

BRIEF DESCRIPTION OF THE DRAWINGS

To facilitate understanding, identical reference numerals have been used, where possible, to designate identical elements that are common to the figures. The images in the drawings are simplified for illustrative purposes and are not depicted to scale.

Figure 1:
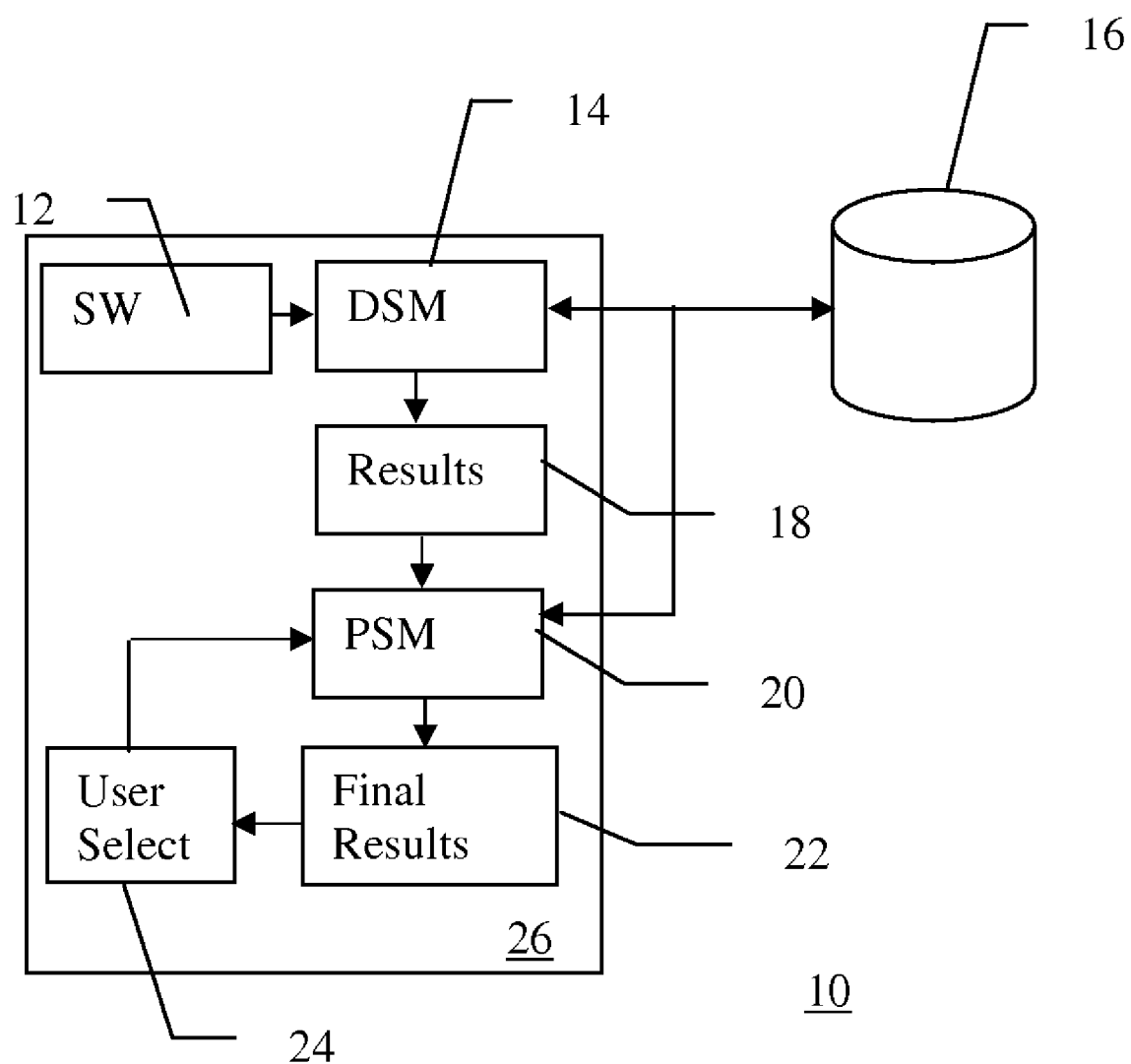
FIG. 1 is a schematic drawing of an exemplary embodiment of the present invention.

The appended drawings illustrate exemplary embodiments of the invention and, as such, should not be considered as limiting the scope of the invention that may admit to other equally effective embodiments. It is contemplated that features or steps of one embodiment may beneficially be incorporated in other embodiments without further recitation.

DETAILED DESCRIPTION

The present invention improves systems and methods of searching images, particularly those systems and methods that use domain specific similarity matrices in the search process. The improvement is made by incorporating a personalized similarity matrix that reflects a user's preferences and previous selections. This may be done by, for instance, by first obtaining similarity scores between images in a database and a key-image using a domain specific similarity matrix. These similarity scores may then be updated by adding in a similarity score that reflects the similarity of the images to domain relevant images in a personalized similarity matrix. The personalized similarity matrix may, for instance, be formed using images selected by the user in previous searches. The user may then be presented with a list of result images that are ranked based on the combined similarity scores. This list should better reflect the user's preferences.

The general process of incorporating user input, or preferences, to improve searches is typically called relevance feedback and is well known in standard text-based search engines. One simple, exemplary, method of implementing relevance feedback in text searches begins with the user performing a query. The top ranked results of the query may then be searched for words not found in the original query. These additional key words may then be added to the query and the query performed again. If the additional words are well selected, the new query will return improved results. This typical application of relevance feedback effectively allows a user to do iterative searching, providing feedback to guide the search engine towards a more useful result. A difficulty with attempting to incorporate an analogous form of relevance feedback into searching images is that there is no text in the result images, or any other primitives, that can reliably function in an analogous way to the additional key words.

In a preferred embodiment of the present invention, this difficulty is overcome and relevance feedback is incorporated into an image search that uses a similarity matrix for a given domain. This incorporation of relevance feedback may be accomplished by creating a personalized similarity matrix (PSM) that has learned the personal preferences of a particular user. The PSM includes, for instance, the images selected by the user from previous results. In addition, the user may select images from a list to indicate their preferred images such as, for instance, their favorite type and color of car. For example, the user may be presented with a series of images of various types, models and colors of car. If the user selects the images of, for instance, a black Corvette or a red Ferrari, these images will be added to their PSM in the domain of cars. When cars are featured in the results of a subsequent search by the user, any examples of, or similarities of an image to, a black Corvette or a red Ferrari would result in those images being given a higher ranking.

In a further embodiment, the user may also select least favorite images as well as favorite images from lists that may include, but are not limited to, images of fashion items, houses, interior design, clothing, shoes, jewelry and people. Similarities to least favorite images may be used to demote an image in a ranked list.

The preferred objects in a PSM may also be called favorite objects, or merchandisable objects, depending on the specific context in which they appear. As described above, users may indicate their favorite objects by choosing from a list. Advertising and marketing specialists may be desirous of data mining the merchandisable objects from a user's PSM.

The PSM of the present invention is a customizable technology for filtering the initial results from an image search engine so that the resulting images will be of higher relevance to the user and will be placed higher up in the hit list. This personal image preference (PIP) filter can also be applied to advertising images so that the advertising imagery would appear to an appropriately targeted audience. The PSM can also be used as a form of demographic about specific users and groups of users to learn how to better target future marketing and advertising campaigns.

The invention may also be implemented as a compliment to a conventional text based information retrieval system. In such an embodiment, the PIP or PSM may aid the ability to place images in the query in addition to the conventional text.

The invention may also be implemented as a complete, stand alone information retrieval system that may include a client terminal and a remote server configured to communicate one with another.

The invention may also be implemented to reside on a digital video recorder (DVR) such as, but not limited to, a TiVo™ television recording device marketed by TiVo Inc., of Alveso, Calif., or a Sony Playstation™ marketed by the Sony Corporation of America of New York, N.Y. or a Microsoft Xbox™ marketed by Microsoft Inc. of Redmond, Wash.

In an Internet implementation of the invention, an Internet service provider ("ISP") may also be present in order to facilitate and route information transmission over the system. Moreover, the client terminal is connected to, associated with, or otherwise has access to an image or video database. According to the invention, the client terminal monitors the images viewed and/or selected by the user, and may include the image/video viewing habits in a user profile which can be used to update the PSM.

When the user requests an information document, such as a Web page, from a remote server, the PSM may be used in conjunction with selection criteria to select an Image set or advertisement appropriate for the user. The image selection and insertion process may be conducted at the client computer, at the server computer, and in Internet implementations, at the ISP. Moreover, selection and insertion may be conducted at any combination of the foregoing sites.

One of ordinary skill in the art will appreciate that the foregoing methods of advertisement selection and insertion may be more generally extended to selection and display of any type of information to a recipient based at least in part on image/video viewing habits.

A preferred embodiment of the invention will now be described in detail by reference to the accompanying drawings in which, as far as possible, like elements are designated by like numbers.

Although every reasonable attempt is made in the accompanying drawings to represent the various elements of the embodiments in relative scale, it is not always possible to do so with the limitations of two-dimensional paper. Accordingly, in order to properly represent the relationships of various features among each other in the depicted embodiments and to properly demonstrate the invention in a reasonably simplified fashion, it is necessary at times to deviate from absolute scale in the attached drawings. However, one of ordinary skill in the art would fully appreciate and acknowledge any such scale deviations as not limiting the enablement of the disclosed embodiments.

FIG. 1 is a schematic drawing of an exemplary embodiment of the present invention. In a preferred embodiment, the multi-media image base search system 10 includes an image search engine 26 and an image database 16. The image database 16 may be in close proximity to the image search engine 26 or it may be distant from it and accessed via wired or wireless access means such as, but not limited to, the Internet, a cable network, a telephone network or a satellite relay or network. The image search engine 26 of a preferred embodiment of this invention may include a search window module 12, a domain specific similarity matrix module 14, a results module 18, a personalized similarity matrix module 20, a final results module 22 and a user selection module 24.

In a preferred embodiment, a user may initiate a search by interacting with the search window module 12. This interaction may take the form of, for instance, the user dragging-and-dropping a key-image onto a predefined area of a screen in order to initiate a search for multi-media content containing a same or similar image. The search window module 12 may for instance be a software module operation on a digital microprocessor. The search window module 12 may also have the capability to perform image analysis and determine a type of object represented by the image placed on the image placed in the predefined area. The search window module 12 may then select an appropriate domain specific similarity matrix module 14 to use to search for matches or close matches to the image using, for instance, the techniques in the co-pending U.S. patent applications incorporated by reference above.

The domain specific similarity matrix module 14 may produce a ranked list of images or video clips available in the image database 16. The ranked list of images may be stored in the results module 18 that may be a memory module associated with a digital microprocessor.

The personalized similarity matrix module 20 may then perform a further ranking of the list of images in the results module 18. This further ranking may, for instance, take the form of finding the similarity between any relevant images in the personalized similarity matrix module 20 and the images in list currently residing in the results module 18. This further measure of similarity may take the form of a P-edit distance and be performed using the methods and the techniques detailed in the co-pending applications incorporated by reference above. For instance, if the key-image is a car, any car images in the personalized similarity matrix module 20 may be compared to the images listed in the results module 18 and similarity scores produced for each pair of images. These new similarity scores may be combined with the similarity scores produced by the domain specific similarity matrix module 14 to produce a new or personalized ranking of the images that may then be stored in the final results module 22. Combining the similarity scores may take the form of simply adding the scores or it may that the form of multiplying the scores by an appropriate weighting factor and then adding. A general form of the combination may be represented by the equation below:

$$S_f = aS_i + bS^1_p \ldots cS^n_p$$

where $S_i$ represents the P-edit distance between the key-image and the current image, $S^1_p$ represents the P-edit distance between the key-image and a first relevant image in the personalized similarity matrix module 20, $S^n_p$ represents the P-edit distance between the key-image and an nth relevant image in the personalized similarity matrix module 20, a, b, and c represent suitable weighting function and $S_f$ represents a final similarity score for the current image that is used to rank the list of images in the final results module 22.

The P-Edit distance metric is used as an indication of the similarity of two images and may be calculated as a weighted sum of insertion, deletion and substitution terms between a first image and a second image. To calculate the P-Edit distance, the first image is divided up into a number of blocks of pixels. Each block of pixels is then matched into the second image, utilizing any one of a number of block matching algorithms, to find the best matching block of pixels in the second image. The sum of the matching errors between the blocks of pixels from the first image and their corresponding blocks of pixels from the second image may be recorded as substitution terms. The regions of the second image for which no matches were found represent one-to-none mapping regions and may be recorded as deletion terms. Likewise, the regions of the second image involved in multiple matches are considered one-to-many mapping regions and may be recorded as insertion terms. The substitution, deletion and insertion terms may be weighted to calculate the final P-Edit distance.

The user selection module 24 enables the viewer to select and view any of the list of final results. The user selection module 24 may interact with a mouse, keyboard, touchpad or other user input means to allow an image or video to be downloaded from the image database 16 and displayed on, for instance, a computer monitor. The user selection module 24 also operates to provide selected images or view to the personalized similarity matrix module 20. In this way the personalized similarity matrix module 20 may be updated and/or expanded.

Figure 2:
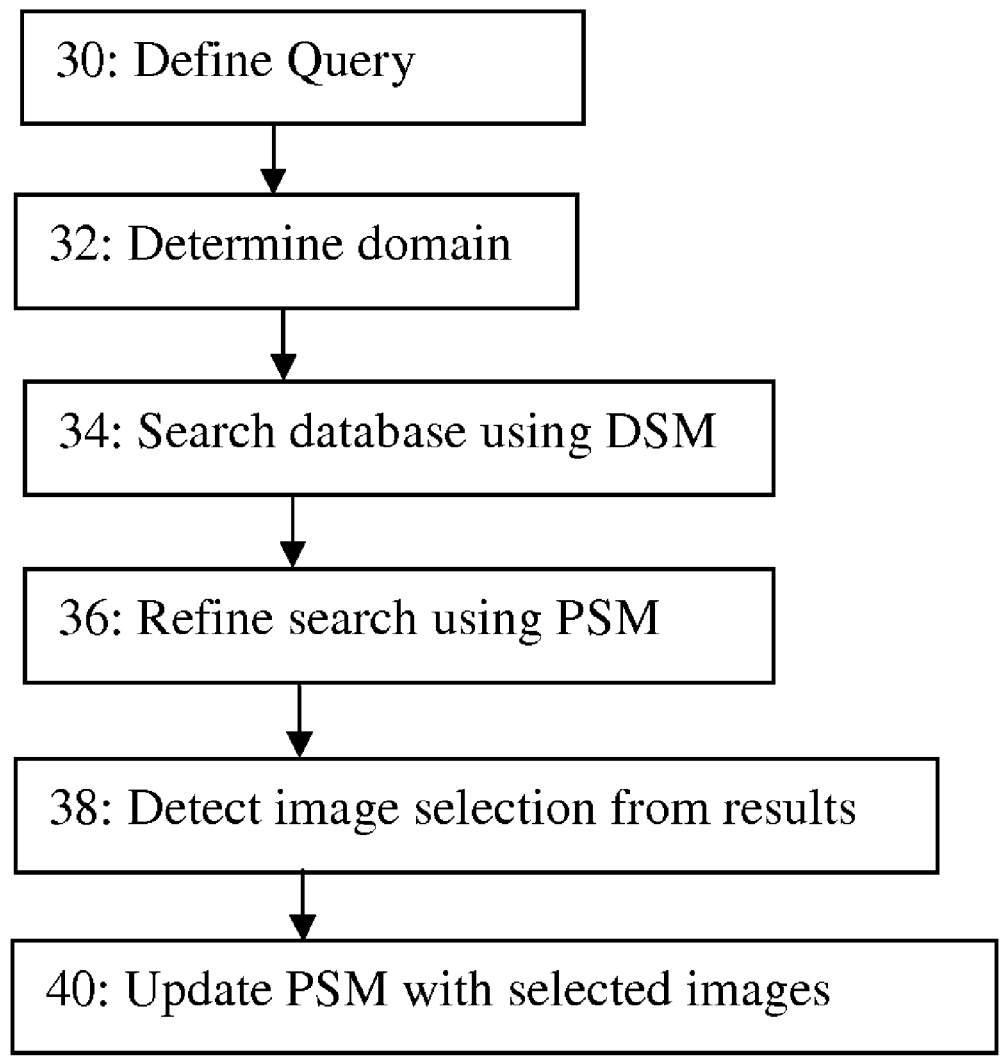
FIG. 2 is a flow chart showing steps in an exemplary embodiment of the present invention.

FIG. 2 is a flow chart showing steps in an exemplary embodiment of the present invention.

In step 30 a query is defined by a user. The query may include one or more key-images and, optionally, one or more key-words. The key images and optional key-words may be linked by Boolean operators.

In step 32 the image search engine 26 examines the query and determines appropriate domains to search. The domains may be representative of objects such as, but not limited to, faces, cars, gadgets, clothes, shoes or houses.

In step 34 the multimedia database is searched using a domain specific similarity matrix module 14. This may include a matrix that has pre-calculated the similarity between all images or video in the image database 16 relevant to the particular domain. Both the similarity and searching the similarity matrix may be performed using methods and techniques described in detail in the co-pending applications incorporated by reference above.

In step 36, the results returned in step 34 may be further refined using a personalized similarity matrix module 20. This may include creating a matrix that incorporates the similarity scores between domain relevant images selected by the user in previous searches and the images returned in step 34. These new similarity scores may then be combined with the original similarity scores and the results re-ranked based on the combined similarity score.

In step 38, the image search engine 26 may detect which image or images the user then selects to view from the refined results list. The selected images may then be used in step 40 to update the personalized similarity matrix module 20.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention. Modifications may readily be devised by those ordinarily skilled in the art without departing from the spirit or scope of the present invention.

What is claimed is:

1. A computer-implemented method of searching a multimedia database, said method comprising the steps of:
   a. receiving one or more key images;
   b. determining one or more domains to which the key images belong by identifying objects contained in said key images;
   c. searching said multimedia database using domain-specific similarity matrices specific to the domains to which said one or more key images have been determined to belong;
   d. providing as a result a list of images from said multimedia database based on said search, said search being performed by calculating an edit distance metric;
   e. applying a personalized similarity matrix to said result list of images to further refine said results;
   f. receiving one or more selected images from said list of refined results, said selected images being determined by calculating an edit distance metric; and
   g. modifying said personalized similarity matrix based on said selected images to form an updated personalized similarity matrix;

wherein said edit distance metric is determined based on matching blocks of pixels between images being compared.

2. The method of claim 1 wherein said personalized similarity matrix has been updated using one or more images selected in prior searches.

3. The method of claim 1 wherein said one or more selected images are selected from said result list of images.

4. The method of claim 1 wherein said personalized similarity matrix comprises one or more preferred images selected in a prior search.

5. The method of claim 4 wherein said one or more preferred images contain an object selected from a list of objects.

6. A computer-readable storage medium, comprising instructions for:
   a. receiving one or more key-images;
   b. determining one or more domains to which the key images belong by identifying objects contained in said key images;
   c. searching a multi-media database of images using domain-specific similarity matrices specific to the domains to which said one or more key images have been determined to belong;
   d. providing a ranked list of images based on a similarity calculated based on an edit distance metric between said database images and said domain-specific similarity matrix;
   e. receiving one or more preferred images selected from said ranked list of images
   f. modifying said domain-specific similarity matrix based on said selections to form a personalized similarity matrix; and
   g. providing a refined ranked list of images based on said personalized similarity matrix, said refined list of images being determined by calculating an edit distance metric;

wherein said edit distance metric is determined based on matching blocks of pixels between images being compared.

7. The method of claim 1 wherein said list of images provided in step (d) is based on their similarity to images represented in said domain-specific similarity matrix.

* * * * *